Patented Apr. 13, 1954

2,675,366

UNITED STATES PATENT OFFICE 2,675,366

STABILIZATION OF POLYETHYLENE

Joseph C. Pullman, Stamford, Conn., assignor to American Cyanamid Company, New York, N. Y., a corporation of Maine No Drawing. Application May 24, 1951, Serial No. 228,118

5 Claims. (Cl. 260—45.95)

This invention relates to the stabilization of polyethylene against oxidative deterioration by the incorporation therein of small amounts of stabilizing agents. The stabilizing agents or antioxidants used in accordance with the invention are alkylene bis-(4,6-dialkylphenols) which are condensation products of aliphatic aldehydes or ketones with 2,4-dialkylphenols.

Polyethylene is a hydrocarbon polymer of considerable commercial importance as a thermoplastic molding and coating agent. One of its most important advantages is its high dielectric strength, coupled with repellent properties against water and water vapor. This causes articles impregnated or coated with ethylene polymer to retain their dielectric properties for considerable periods of time. Polyethylenes having an average molecular weight within the range of about 6,000 to about 20,000 are therefore of great value as insulators or dielectrics in condensers and other similar electronic equipment.

Unfortunately, however, ethylene polymers are subject to attack by atmospheric oxygen, particularly at elevated temperatures, and when even slightly oxidized they suffer a reduction in their desirable electrical properties. The molten polymers also exhibit gelation upon oxidation. It is a particular object of the present invention to reduce or inhibit this oxidative deterioration in polyethylene by incorporating therein small but effective quantities of the class of antioxidants referred to above and hereinafter more particularly described.

I have found that the alkylene bis-(4,6-dialkylphenols) are excellent stabilizers and antioxidants for polyethylene, even when used in very small amounts. Appreciable improvements are noted in most cases when as little as 0.01% of the antioxidant is used, and effective amounts are within the range of 0.05% to 0.5%, based on the weight of the polyethylene. My present invention therefore consists essentially in controlling oxidative deterioration in polyethylene by incorporating therein stabilizing amounts of alkylene bis-(4,6-dialkylphenols), and in the resulting stabilized polyethylenes.

The alkylene bis-(4,6-dialkylphenols) are prepared by condensing a 2,4-dialkylphenol with any suitable aldehyde or ketone. Among the 2,4-dialkylphenols that can be condensed by this procedure and used in practicing the invention are those obtainable by condensing para-cresol with aliphatic alcohols or with olefins of 1–8 carbon atoms or more, using suitable Friedel-Crafts catalysts such as aluminum chloride, zinc chloride or concentrated sulfuric acid. The conditions of alkylation are described, for example, in "Organic Reactions," volume 3 (1946), chapter 1.

Phenols that can be prepared by this method are 2,4-dimethylphenol, 2-isopropyl-4-methylphenol, 2-sec.-butyl-4-methylphenol, 2-tert-butyl-4-methylphenol, 2-diisopropyl-4-methylphenol, 2-sec.-octyl-4-methylphenol and 2-triisopropyl-4-methylphenol, which is prepared commercially by condensing triisopropylene with para-cresol in the presence of a sulfuric acid catalyst. Any of these or other similar 2-alkylated para-cresols may be condensed with formaldehyde under the conditions described above to form 2,2'-methylene bis-(4-methyl-6-alkylphenols) for use in practicing the invention, or may be condensed with other aliphatic aldehydes or ketones.

Typical of the compounds which may be used as polyethylene antioxidants are 2,2'-methylene bis-(4-methyl-6-tert.-butylphenol), 2,2'-methylene bis-(4-methyl-6-tert.-octylphenol), 2,2'-methylene bis-(4-methyl-6-tert.-dodecylphenol), 2,2'-methylene bis-(4-tert.-butyl-6-methylphenol), 2,2'-methylene bis-(4-tert.-octyl-6-methylphenol), 2,2'-methylene bis-(4-tert.-dodecyl-6-methylphenol), 2,2'-methylene bis-(4,6-tert.-butylphenol), 2,2'-methylene bis-(4,6-tert.-octylphenol), 2,2'-methylene bis-(4,6-tert.-dodecylphenol), 2,2'-methylene bis-(4-methyl-6-amylphenol), 2,2'-methylene bis-(4,6-diamylphenol), 2,2'-methylene bis-(4-tert.-butyl-6-tert.-octylphenol), 2,2'-methylene bis-(4-tert.-butyl-6-tert.-dodecylphenol), 2,2'-methylene bis-(4-tert.-octyl-6-tert.-dodecylphenol), 2,2'-methylene bis-(4,6 - dioctylphenol), 2,2' - methylene bis - (4 - methyl-6-dodecylphenol), 2,2'-methylene bis-(4-butyl-6-amylphenol), and 2,2'-methylene bis-(4-octyl-6-dodecylphenol). Other alkylene bis-(dialkylphenols) can be used such as the corresponding ethylene, propylene and butylene bis-(dialkylphenols), for example 2,2'-ethylidene bis-(4-methyl-6-tert.-butylphenol), 2,2'-ethylidene bis-(4-methyl-6-tert.-octylphenol), 2,2'-ethylidene bis-(4,6-ditert.-dodecylphenol), 4,4'- isopropylidene bis-(2,6-ditert.-butylphenol), 2,2'-isopropylidene bis-(4-tert.-butyl-6-amylphenol), 2,2'-isopropylidene bis-(4,6-ditert.-dodecylphenol), and the like compounds.

The invention will be more readily understood by a consideration of the following specific examples. Inasmuch as methods for the preparation of many of the alkylene bis-(4,6-dialkylphenols) are not readily available in the literature, the first of these examples describe in detail the preparation of the antioxidants evaluated, these particular antioxidants being preferred compounds for use in practicing the invention. Examples 11–13 inclusive describe the test procedures employed and the results obtained.

*Example 1*

105 parts (0.64 mol) of 2-methyl-4-tert.-butylphenol and 10.5 parts (0.35 mol) of paraformaldehyde are suspended in 125 cc. of heptane and 12 parts of concentrated HCl added. The mixture is stirred overnight at room temperature and then heated to reflux while passing gaseous HCl through the solution until the water of reaction has distilled over azeotropically. 60 parts (55% yield) of the product crystallizes from the cold reaction mixture, melting at 112°–118° C. Recrystallization from fresh heptane gives a product melting at 126°–127° C.

*Example 2*

206 parts (1 mol) of 4,6-ditert.-butylphenol and 16.5 parts (0.55 mol) of paraformaldehyde is dissolved in 200 cc. of heptane. 10 parts of concentrated HCl is added dropwise to the solution at 20–30° C. and the mixture is stirred overnight. Solids fail to precipitate from the chilled reaction mixture at this point, so the reaction mixture is digested at 50–60° C. for 2 hours and refluxed at 85° C. for 2.5 hours until the water of reaction has distilled azeotropically. The reaction mixture is then chilled and 50 parts (24% yield) of the product, melting at 138°–141° C., is crystallized. Recrystallization from fresh heptane gives a product melting at 142°–143° C.

*Example 3*

103 parts (0.5 mol) of 2,4-ditert.-butylphenol and 14.5 parts (0.25 mol) of acetone are mixed without diluent and treated with 21.5 parts of concentrated HCl containing 0.25 mol of hydrogen chloride. The whole is agitated for 70 hours at room temperature, washed with water, neutralized with gaseous ammonia, and again washed with water until neutral. Addition of solvent heptane is necessary to facilitate washing. Heptane is then stripped from the reaction mixture in vacuo and the product is then distilled in high vacuum. 25 parts (0.12 mol) of 4,6-ditert.-butylphenol distills from the reaction mixture at 76° C. and 0.05 mm. of mercury at a pot temperature up to 96° C. 71 parts (82.5% yield) of crude product is thus obtained as a mahogany-colored, viscous liquid which fails to crystallize.

*Example 4*

82 parts (0.5 mol) of 4-methyl-6-tert.-butylphenol, 10 parts of concentrated HCl and 0.2 part of Duponol C are charged to a 500 ml. flask, 100 parts of heptane is added and the contents of the flask agitated while warming to 40° C. 23 parts of 36% aqueous formaldehyde solution, containing 8.25 parts (0.275 mol) of HCHO, are added dropwise so that the temperature does not exceed 60° C. The reaction mixture is digested at 50°–60° C. for 3 hours, cooled to 20° C. and the solid product is collected in a filter. The product is slurried in 500 parts of water containing 20 parts of heptane and 0.25% of Duponol, filtered, and dried. The product weighs 73 g.; M. P. 125°–128° C.; yield 87%. The aqueous layer is separated from the mother liquor and discarded and 15 parts of fresh heptane is added with a fresh charge of 0.5 part of 4-methyl-6-tert.-butylphenol, 10 parts of concentrated HCl, and 0.2 part of Duponol C. Processing as above, 80 parts of product is obtained; M. P. 123°–125° C.; yield 95%.

*Example 5*

200 grams (0.91 mol) of octylcresol is mixed with 10 grams of concentrated hydrochloric acid. 42 grams (0.46 mol) of 36% aqueous formaldehyde solution is added thereto and the reaction mixture heated for 1 hour at 55°–60° C. The mixture becomes an unstirrable mass, necessitating the addition of 250 cc. of heptane as diluent, after which the mixture is stirred for an additional 2 hours at 55°–60° C. The product is then washed with water and the heptane-water mixture removed by azeotropic distillation. 123 grams of a substantially colorless viscous product is obtained. On crystallization from heptane a colorless product is obtained which has a melting point of 116–118° C.

*Example 6*

234 grams (1.0 mol) of 2,4-diamylphenol is mixed with 10 grams of concentrated HCl. To the mixture is added 46 grams (0.55 mol) of 36% aqueous formaldehyde solution, with stirring, and the reaction mixture is stirred for 4 hours at about 50° C. The reacted material is thereafter diluted with 250 cc. of heptane and then thoroughly water-washed. The water and heptane are removed by azeotropic distillation to recover 243 grams of thick, viscous, almost colorless liquid product.

*Example 7*

41 grams (0.25 mol) of 4-methyl-6-tert.-butylphenol and 5.5 grams (0.125 mol) of acetaldehyde is dissolved in 150 cc. of heptane and treated with 4.56 grams (0.125 mol) of hydrogen chloride as concentrated HCl. The mixture is stirred overnight at room temperature and then heated to reflux to remove water. On removal of the solvent heptane by vacuum distillation, 35 grams of a mahogany-colored, viscous liquid product is obtained. This material crystallizes slowly over a period of several weeks.

2,2'-butylidene bis-(4-methyl-6-tert.-butylphenol) is prepared by the same procedure, substituting for the acetaldehyde an equivalent quantity of butyraldehyde.

*Example 8*

356 grams (2 mols) of 2-tert.-butyl-4-ethylphenol is dissolved in 350 cc. of heptane and stratified over 92 grams of 36% aqueous formaldehyde solution containing 33 grams (1.1 mols) of formaldehyde. 1 gram of Duponol C is added to the mixture which is then stirred while warming to 50° C. over a steam bath. 42 cc. of concentrated HCl containing 15.5 grams of hydrogen chloride is added dropwise while the temperature is maintained at or below 60° C. The reaction mixture is thereafter heated at 50°–60° C. for 3 hours. The aqueous acid-containing layer is then separated from the heptane solution of product, and the product-containing solution is washed with water. The water-washed heptane solution is then chilled in an ice bath and 158 grams (43%) of the product crystallizes. This material has a melting point of 108–117° C. On recrystallization from fresh heptane the product melts at 123° C.

Example 9

A mixture of 45 grams (0.3 mol) of 2-isopropyl-4-methylphenol, 13.6 grams (1.65 mols) of aqueous formalin, 30 cc. of a mixture of equal parts of water and solvent naphtha and 1.5 grams of concentrated sulfuric acid was heated at 95° C. for 2.5 hours. The resulting solution was neutralized with 25% sodium hydroxide solution and poured into water.

After standing for 16 hours the water was removed and the resinous material was dissolved in heptane and washed with water until it was neutral. The solution was then shaken with decolorizing carbon, filtered and the solvent removed by heating to a temperature of 150° C. under 3 mm. of mercury pressure. The yield was 46 grams of an amorphous product that was insoluble in water and in aqueous alkalies but soluble in polyethylene.

Example 10

Fifty parts (0.41 mol) of 2,4-dimethylphenol is mixed with 40 parts of concentrated hydrochloric acid containing 14.6 parts (0.40 mol) of hydrogen chloride. 33.2 parts of 36% aqueous formaldehyde solution is added and the reaction mixture heated on a steam bath for two hours. The product agglomerates into an unstirrable mass, necessitating addition of 100 parts of toluene as diluent. The toluene solution of the product is washed until neutral and chilled in an ice bath. 19 parts (37% yield) of the product, melting at 144° C., crystallizes from the solution. Recrystallization from heptane does not change the melting point of the product.

Example 11

The following test procedure was used to evaluate the above-described antioxidants in polyethylene. The indicated amounts of antioxidant were weighed into tall form 200 ml. beakers and a part of the polyethylene was added and melted on a hot plate and stirred until the antioxidant had dissolved. The remainder of the polyethylene was then added and melted with stirring. The beakers were placed in a bath of Woods' metal maintained at 240–245° C., which kept the polyethylene at 232° C., and heated with stirring for four hours. The product of Example 4 was tested in this manner at concentrations of 0.01%, 0.05% and 0.1%. Another sample of polyethylene containing no antioxidant was heated in the same manner as a control. The polyethylene used had an average molecular weight of about 12,000.

After 4 hours' heating the control sample was extremely viscous and appeared to have gelled. The sample containing 0.01% of antioxidant showed some increase in viscosity. No increase in the viscosity of the other two samples was observed.

Example 12

Samples were prepared as described in the preceding example, using 2,2'-methylene bis-(4-methyl-6-tert.-butylphenol) as the antioxidant, and heated 4 hours at 450° F. while being mechanically agitated in the presence of air. The products were cooled and molded into disks of about 4 inches diameter and ⅛ inch thick. Electrical dissipation factors were determined for each disk at a frequency of 60 cycles. The results were as follows:

| Polyethylene | Percent Antioxidant | Dissipation Factor |
| --- | --- | --- |
| Not heated | None | 0.0005 |
| Heated 4 hrs | None | 0.0013 |
| Do | 0.01 | 0.0009 |
| Do | 0.05 | 0.0006 |
| Do | 0.1 | 0.0003 |

The action of the antioxidant in retaining the high electrical insulating properties of the polyethylene is evident from these figures.

Example 13

The procedure of Example 12 was repeated with 0.1% of a number of other antioxidants. The results are given in the following table:

| Product of Example | Name | Dissipation Factor |
| --- | --- | --- |
| 1 | 2,2'-methylene bis-(4-butyl-6-methylphenol) | 0.00023 |
| 2 | 2,2'-methylene bis-(4,6-dibutylphenol) | 0.00025 |
| 3 | 2,2'-isopropylidene bis-(4,6-dibutylphenol) | 0.00022 |
| 4 | 2,2'-methylene bis-(4-methyl-6-butylphenol) | 0.00020 |
| 5 | 2,2'-methylene bis-(4-methyl-6-octylphenol) | 0.00025 |
| 6 | 2,2'-methylene bis-(4,6-diamylphenol) | 0.00023 |
| 7 | 2,2'-ethylidene bis-(4-methyl-6-butylphenol) | 0.00026 |
| 8 | 2,2'-methylene bis-(4-ethyl-6-butylphenol) | 0.00030 |
| 9 | 2,2'-methylene bis-(4-methyl-6-isopropylphenol) | 0.00027 |
| 10 | 2,2'-methylene bis-(4,6-dimethylphenol) | 0.00020 |
| 7 | 2,2'-butylidene bis-(4-methyl-6-butylphenol) | 0.00020 |

From these examples, and from the foregoing discussion, it will be seen that the preferred antioxidants used in practicing the invention are the 2,2'-alkylene bis-(4,6-dialkylphenols) containing an alkylene hydrocarbon radical of about 1–4 carbon atoms and aliphatic hydrocarbon substituents on the phenolic groups of chain lengths up to about 12 carbon atoms. These compounds are condensation products of 2 mols of a dialkylphenol containing up to 30 carbon atoms with 1 mol of an aliphatic aldehyde or ketone such as formaldehyde, acetaldehyde, propionaldehyde, butyraldehyde, acetone, methylethylketone, methylpropylketone, diethylketone, ethylpropylketone and the like. These condensation products are, in general, solids or viscous liquids that are soluble in hydrocarbon solvents. They are also soluble in polyethylene to the extent necessary to impart antioxidant properties thereto. These compounds can also be dissolved in polyethylene to concentrations considerably higher than those used for antioxidant purposes; therefore concentrates containing up to 1% to 5% or more of the alkylene bis-(2,4-dialkylphenols) can be prepared and stored and subsequently blended with additional quantities of ethylene polymer to impart antioxidant properties thereto. Thus, for example, a 1% to 5% solution of 2,2'-methylene bis-(4-methyl-6-tert.-butylphenol) in polyethylene is a concentrate of substantial commercial value that constitutes a product of commercial value in accordance with the present invention.

What I claim is:

1. A method of controlling oxidative deterioration in polyethylene which comprises incorporating therein a small amount, sufficient to reduce oxidation therein, of a 2,2'-methylene bis-(4,6-dialkylphenol).

2. A method according to claim 1 in which the bis-phenol is 2,2'-methylene bis-(4-methyl-6-butylphenol).

3. Polyethylene stabilized against oxidative deterioration by a content of 0.01% to 0.5% of a 2,2'-methylene bis-(4,6-dialkylphenol).

4. Polyethylene stabilized against oxidative deterioration by a content of 0.01% to 0.5% of 2,2'-methylene bis-(4-methyl-6-butylphenol).

5. A concentrate composed of about 99% to 95% by weight of polyethylene and about 1% to 5% of 2,2'-methylene-bis-(4-methyl-6-butylphenol).

References Cited in the file of this patent

UNITED STATES PATENTS

| Number | Name | Date |
|---|---|---|
| 2,434,662 | Latham et al. | Jan. 20, 1948 |
| 2,538,355 | Davis et al. | Jan. 16, 1951 |

OTHER REFERENCES

Chem. and Eng. News, vol. 28, No. 35, Aug. 28, 1950, page 2967.